United States Patent
Sato et al.

(10) Patent No.: US 12,321,027 B2
(45) Date of Patent: Jun. 3, 2025

(54) OPTICAL FIBER RIBBON

(71) Applicant: SUMITOMO ELECTRIC INDUSTRIES, LTD., Osaka (JP)

(72) Inventors: Toshihisa Sato, Osaka (JP); Takashi Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 177 days.

(21) Appl. No.: 18/257,630

(22) PCT Filed: Dec. 8, 2021

(86) PCT No.: PCT/JP2021/045101
§ 371 (c)(1),
(2) Date: Jun. 15, 2023

(87) PCT Pub. No.: WO2022/131099
PCT Pub. Date: Jun. 23, 2022

(65) Prior Publication Data
US 2024/0045162 A1 Feb. 8, 2024

(30) Foreign Application Priority Data
Dec. 18, 2020 (JP) .................. 2020-210491

(51) Int. Cl.
*G02B 6/44* (2006.01)
(52) U.S. Cl.
CPC .................. *G02B 6/4403* (2013.01)
(58) Field of Classification Search
CPC .................................... G02B 6/4403
USPC ........................................ 385/114
See application file for complete search history.

(56) References Cited

U.S. PATENT DOCUMENTS

| | | |
|---|---|---|
| 2015/0049997 A1 | 2/2015 | Isaji et al. |
| 2017/0090135 A1 | 3/2017 | Sato et al. |
| 2019/0049681 A1 | 2/2019 | Bookbinder et al. |

(Continued)

FOREIGN PATENT DOCUMENTS

| | | |
|---|---|---|
| EP | 3923052 A1 | 12/2021 |
| JP | 2003-241042 A | 8/2003 |
| JP | 2012-208312 A | 10/2012 |

(Continued)

OTHER PUBLICATIONS

International Search Report dated Mar. 8, 2022 issued in PCT/JP2021/045101.
Written Opinion dated Mar. 8, 2022 issued in PCT/JP2021/045101.

*Primary Examiner* — Jerry M Blevins
(74) *Attorney, Agent, or Firm* — McDonald Hopkins LLC

(57) ABSTRACT

Provided is an intermittently coupled optical fiber ribbon in which a bonded portion in which adjacent optical fibers are bonded by an adhesive resin and a non-bonded portion are intermittently provided in a longitudinal direction. The bonded portion is provided on one side of the optical fiber ribbon. A part of the bonded portion protrudes further than a tangent line passing through surfaces of the adjacent optical fibers on the one side. In the longitudinal direction, at least one of longitudinal end portions of the bonded portion has a larger protrusion height than a central portion of the bonded portion. The adhesive resin has a composite elastic modulus of 0.5 GPa or more and 6.0 or less at 23° C.

4 Claims, 2 Drawing Sheets

(56) References Cited

U.S. PATENT DOCUMENTS

2019/0121044 A1* 4/2019 Ishikawa .............. G02B 6/4403
2022/0075134 A1   3/2022 Sato et al.

FOREIGN PATENT DOCUMENTS

| JP | 2013-182157 A | 9/2013 |
| JP | 2016-133607 A | 7/2016 |
| JP | 2016-146003 A | 8/2016 |
| JP | 2017-062431 A | 3/2017 |
| JP | 2021-012269 A | 2/2021 |
| WO | 2020162501 A1 | 8/2020 |

* cited by examiner

OPTICAL FIBER RIBBON

TECHNICAL FIELD

The present disclosure relates to an optical fiber ribbon. The present disclosure claims priority from Japanese Patent Application No. 2020-210491 filed on Dec. 18, 2020, contents of which are incorporated by reference in its entirety.

BACKGROUND ART

Patent Literatures 1 and 2 each disclose a so-called intermittently coupled optical fiber ribbon. Patent Literature 1 discloses an optical fiber ribbon obtained by applying approximately the same amount of an adhesive member, which bonds optical fibers constituting the optical fiber ribbon, to both an upper side and a lower side of the optical fiber ribbon. Patent Literature 1 further discloses that by setting a thickness of the adhesive member for the optical fiber ribbon at "thickness=$(\sqrt{3}-1)/2 \times D$ (D is fiber diameter)", optical fibers are prevented from coming into contact with the adhesive member of other optical fibers when densely stacked.

Also in the optical fiber ribbon of Patent Literature 2, an adhesive member is applied to both an upper side and a lower side of the optical fiber ribbon. Patent Literature 2 further discloses that a thickness of a part of the adhesive member is set at such a thickness that the adhesive member protrudes further than a tangent line passing through surfaces of coated optical fibers at least at a central portion of the adhesive member.

CITATION LIST

Patent Literature

Patent Literature 1: JP2016-133607A
Patent Literature 2: JP2016-146003A

SUMMARY OF INVENTION

According to an aspect of the present disclosure, there is provided an intermittently coupled optical fiber ribbon in which a bonded portion in which adjacent optical fibers are bonded by an adhesive resin and a non-bonded portion in which the adjacent optical fibers are not bonded by the adhesive resin are intermittently provided in a longitudinal direction among a part or all of a plurality of optical fibers arranged side by side in a width direction orthogonal to the longitudinal direction.

The bonded portion is provided on one side of the optical fiber ribbon.

A part of the bonded portion protrudes further than a tangent line passing through surfaces of the adjacent optical fibers on the one side.

In the longitudinal direction, at least one of longitudinal end portions of the bonded portion has a larger protrusion height than a central portion of the bonded portion.

The adhesive resin has a composite elastic modulus of 0.5 GPa or more and 6.0 GPa or less at 23° C.

DESCRIPTION OF EMBODIMENTS

Technical Problem

Figure 1:
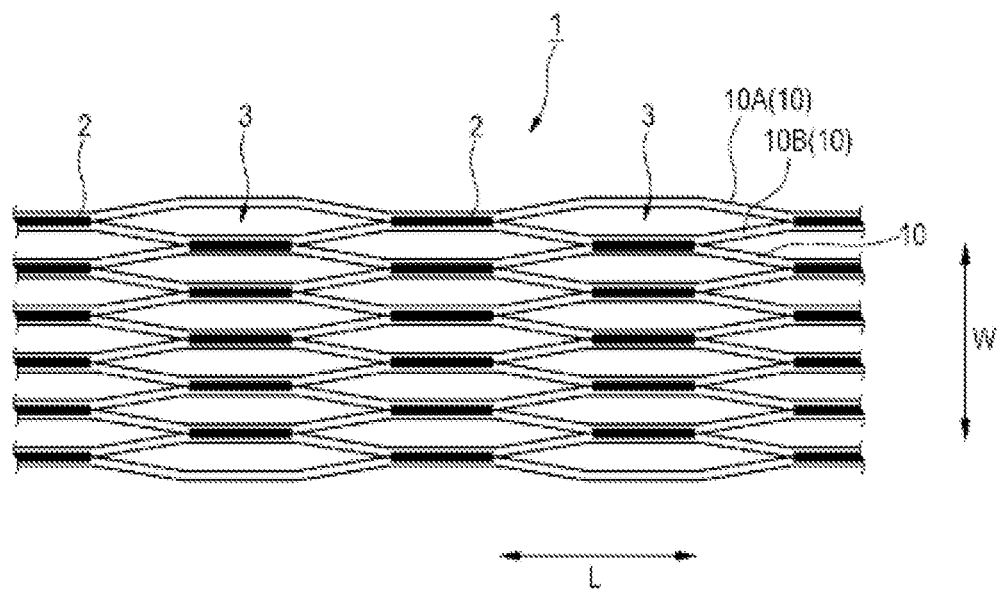
FIG. 1 is a schematic plan view showing an optical fiber ribbon according to an embodiment.

In the optical fiber ribbon described in Patent Literature 1, the same amount of an adhesive resin is provided on both sides of the optical fiber ribbon. The thickness of the adhesive resin is set at such a thickness that the adhesive resin does not come into contact with other optical fibers. For this reason, when a force is applied to roll and bend the optical fiber ribbon in a cross-sectional direction thereof at the time of housing the optical fiber ribbon in an optical cable, breakage of the bent adhesive resin on an outer side or peeling of the adhesive resin from optical fibers is likely to occur. As a result, the optical fibers may be separated.

In the optical fiber ribbon described in Patent Literature 2, since the thickness of a part of the bonded portion on both sides of the optical fiber ribbon is set at such a thickness that the bonded portion protrudes further than the tangent line passing through surfaces of coated optical fibers at least at the central portion of the bonded portion, a cross-sectional area of the optical fiber ribbon increases, which is disadvantageous to increasing a density of an optical cable.

An object of the present disclosure is to prevent an increase in a cross-sectional area of an optical fiber ribbon, make breakage of an adhesive resin or peeling between the adhesive resin and the optical fiber less likely to occur, and reduce a risk of separation of an optical fiber.

Advantageous Effects of Invention

According to a configuration of the present disclosure, it is possible to prevent an increase in a cross-sectional area of an optical fiber ribbon, make breakage of the adhesive resin or peeling between the adhesive resin and the optical fiber less likely to occur, and reduce a risk of separation of an optical fiber.

DESCRIPTIONS OF EMBODIMENTS

Embodiments of the present disclosure are listed and described.

According to an aspect of the present disclosure, there is provided an intermittently coupled optical fiber ribbon in which a bonded portion in which adjacent optical fibers are bonded by an adhesive resin and a non-bonded portion in which the adjacent optical fibers are not bonded by the adhesive resin are intermittently provided in a longitudinal direction among a part or all of a plurality of optical fibers arranged side by side in a width direction orthogonal to the longitudinal direction.

The bonded portion is provided on one side of the optical fiber ribbon.

A part of the bonded portion protrudes further than a tangent line passing through surfaces of the adjacent optical fibers on the one side.

In the longitudinal direction, at least one of longitudinal end portions of the bonded portion has a larger protrusion height than a central portion of the bonded portion.

The adhesive resin has a composite elastic modulus of 0.5 GPa or more and 6.0 GPa or less at 23° C.

In the longitudinal end portions of the bonded portion in the longitudinal direction, the adhesive resin generally has a smaller thickness than the central portion of the bonded portion in the longitudinal direction since the adhesive resin is interrupted when applied. In this case, the bonded portion is likely to break or be peeled from the longitudinal end portions where stress is easily concentrated. In the above configuration, since at least one of the longitudinal end portions of the bonded portion is thicker than the central portion of the bonded portion in the longitudinal direction, the bonded portion can be less likely to break or be peeled off from the longitudinal end portions, and a risk of separation of the optical fibers can be reduced. In addition, since the adhesive resin has a composite elastic modulus of 0.5 GPa or more, the adhesive resin can be less likely to break or the like, and since the composite elastic modulus is 6.0 GPa or less, transmission loss at low temperature can be reduced. In addition, since the adhesive resin is provided only on a surface on one side of the optical fiber ribbon, an increase in a cross-sectional area of the optical fiber ribbon can be prevented, thereby contributing to an increase in a density of an optical cable.

In the optical fiber ribbon, tear strength when tearing the bonded portion measured based on a tear test defined in JIS C 6838:2019 is preferably 0.005 N or more and 0.200 N or less.

According to this configuration, the tear strength for the bonded portion is set at 0.005 N or more, and thus the adhesive resin can be less likely to break or the like, and the risk of separation of the optical fibers can be further reduced. In addition, since the tear strength for the bonded portion is set at 0.200 N or less, the adhesive resin is less likely to remain on the optical fibers when an operator tears the bonded portion, and a decrease in workability in a subsequent step such as insertability of the optical fibers into a protective tube can be prevented.

In the optical fiber ribbon, a maximum value of the protrusion height of the bonded portion from the tangent line is preferably 10 μm or more and 100 μm or less.

According to this configuration, the maximum value of the protrusion height is set at 10 μm or more to increase the amount of the adhesive resin used and the cross-sectional area of the adhesive resin, and thus the adjacent optical fibers can be more firmly bonded. As a result, the adhesive resin can be less likely to break due to an external force or the like, and the risk of separation of the optical fibers can be further reduced. In addition, since the maximum value of the protrusion height is set at 100 μm or less, deterioration of transmission loss at low temperature can be reduced.

In the optical fiber ribbon, in the width direction, each of widthwise end portions of the bonded portion is preferably located outside relative to a center of a corresponding one of the adjacent optical fibers.

According to this configuration, a sufficient amount of the adhesive resin is used, and a contact area between the adhesive resin and the optical fibers is increased in the width direction. Accordingly, breakage of the adhesive resin or peeling between the adhesive resin and the optical fibers can be less likely to occur, and the risk of separation of the optical fibers can be further reduced.

DETAILS OF EMBODIMENTS

Hereinafter, examples of the embodiments according to the present disclosure will be described with reference to the drawings. In the following description, the same or equivalent elements are denoted by the same reference numerals even in different drawings, and redundant description will be appropriately omitted. In the drawings used for the following description, the scale is appropriately changed to make members recognizable.

First, an overview of an optical fiber ribbon 1 of the present disclosure and optical fibers 10 provided therein will be described with reference to FIGS. 1 and 2. FIG. 1 is a schematic plan view showing the optical fiber ribbon 1 according to the present embodiment. The optical fiber ribbon 1 includes a plurality of (12 in this example) optical fibers 10 (including 10A and 10B). The plurality of optical fibers 10 are arranged side by side in a width direction W orthogonal to a longitudinal direction L. The optical fiber ribbon 1 is an intermittently coupled optical fiber ribbon in which a bonded portion 2, in which adjacent optical fibers 10 are bonded by an adhesive resin, and a non-bonded portion 3, in which the adjacent optical fibers 10 are not bonded by the adhesive resin, are intermittently provided along the longitudinal direction L.

In the optical fiber ribbon 1 shown in FIG. 1, every two independent optical fibers 10 are bonded by the adhesive resin. Alternatively, every three optical fibers 10 may be bonded. The optical fiber ribbon 1 may be constituted by a plurality of optical fibers each obtained by collectively coating a plurality of optical fibers 10 with a coating resin and coupling the plurality of coated optical fibers 10. Locations where the bonded portion 2 and the non-bonded portion 3 are intermittently provided may be provided among a part of the optical fibers 10 or among all optical fibers 10.

Figure 2:
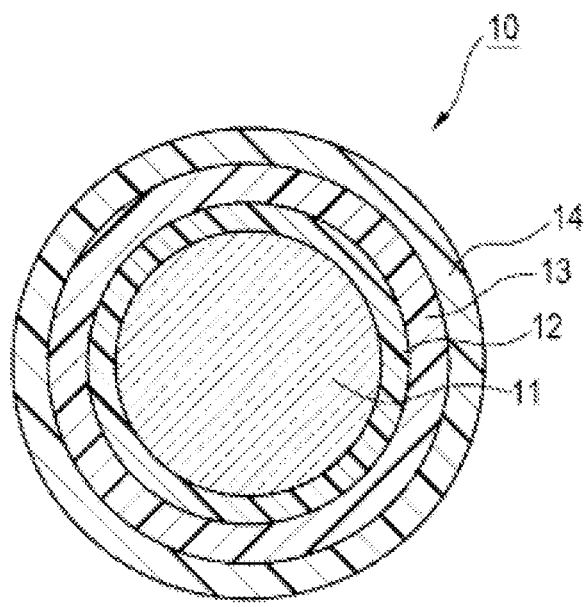
FIG. 2 is a schematic cross-sectional view of an optical fiber according to the embodiment.

FIG. 2 is a schematic cross-sectional view of the optical fiber 10 according to the present embodiment. FIG. 2 is a schematic cross-sectional view of the optical fiber 10 shown in FIG. 1 cleaved along a plane including a thickness direction perpendicular to the longitudinal direction L and the width direction W.

The optical fiber 10 shown in FIG. 2 includes an optical fiber 11, a primary resin layer 12, a secondary resin layer 13, and a colored resin layer 14. An outer diameter of the optical fiber 10 is not particularly limited and may be, for example, about 200 μm or more or less.

The optical fiber 11 includes a core and cladding. The optical fiber 11 is, for example, a glass fiber. The primary resin layer 12 covers an outer periphery of the optical fiber 11. The primary resin layer 12 is formed of, for example, a soft ultraviolet curable resin having a relatively low Young's modulus. The secondary resin layer 13 covers an outer periphery of the primary resin layer 12. The secondary resin layer 13 is formed of, for example, a hard ultraviolet curable resin having a relatively high Young's modulus. The colored resin layer 14 covers an outer periphery of the secondary resin layer 13. The colored resin layer 14 is a layer for improving identification of the optical fiber 10, and is formed of, for example, a colored ultraviolet curable resin.

Figure 3:
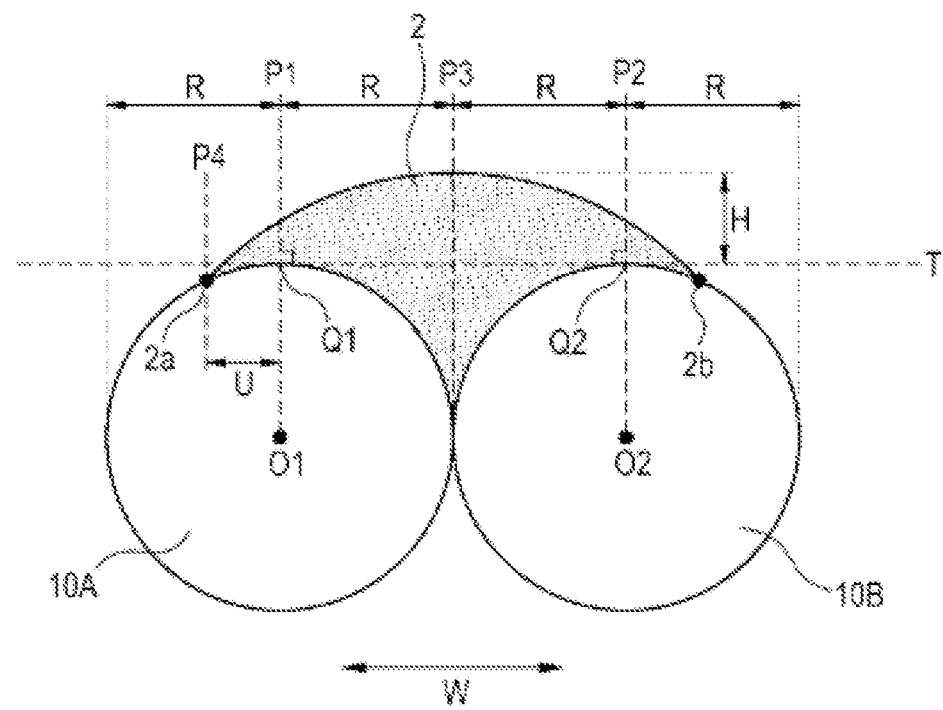
FIG. 3 is a schematic cross-sectional view of a bonded portion in the optical fiber ribbon according to the embodiment.

Next, the bonded portion 2 in the optical fiber ribbon 1 will be described in detail with reference to FIGS. 3 and 4. FIG. 3 is a schematic cross-sectional view of the bonded portion 2 in the optical fiber ribbon 1 according to the present embodiment. Specifically, FIG. 3 is a schematic cross-sectional view when the optical fibers 10A and 10B and the bonded portion 2 provided between the optical fibers 10A and 10B shown in FIG. 1 are cleaved along a plane including the thickness direction. In FIG. 3, layers provided in the optical fibers 10A and 10B are not shown.

The bonded portion 2 is formed by curing an adhesive resin. A type of the adhesive resin is not particularly limited as long as a composite elastic modulus thereof satisfies the above definition, and for example, an acrylic ultraviolet curable resin or an epoxy ultraviolet curable resin may be used. The adhesive resin may be a thermosetting resin.

The composite elastic modulus of the adhesive resin at 23° C. after curing is 0.5 GPa or more and 6.0 GPa or less. The composite elastic modulus is preferably 1 GPa or more, and more preferably 2 GPa or more from a viewpoint of making the adhesive resin less likely to break or the like. The composite elastic modulus is preferably 4.5 GPa or less, and more preferably 3.0 GPa or less from a viewpoint of further reducing transmission loss at low temperature. The composite elastic modulus of the adhesive resin may be adjusted by, for example, the type of the adhesive resin, a molecular weight of an oligomer, the number of functional groups contained in a monomer, and a blending ratio thereof. The composite elastic modulus in the present specification is a composite elastic modulus in the thickness direction measured by a test method based on ISO 14577.

As shown in FIG. 3, a part of the bonded portion 2 protrudes upward than a tangent line T passing through surfaces (contact point Q1, contact point Q2) of adjacent optical fibers and 10B on one side. The protrusion may be provided, for example, by adjusting an application amount of the adhesive resin. Here, one side means one of an upper side and a lower side relative to a line connecting centers of adjacent optical fibers.

A maximum value H of a height of the protrusion of the bonded portion 2 from the tangent line T is preferably 10 µm or more and 100 µm or less, and more preferably 20 µm or more and 50 µm or less. The maximum value H of the height of the protrusion may be provided, for example, by adjusting the application amount of the adhesive resin.

The height of the protrusion is preferably maximum in a vicinity of a center of the bonded portion 2 in the width direction W. That is, the height of the protrusion is preferably maximum in a vicinity of a straight line P3 passing through a contact point between the optical fiber 10A and the optical fiber 10B. The bonded portion 2 is preferably gradually inclined in a curved shape from the vicinity of the center of the bonded portion 2 toward widthwise end portions 2a and 2b thereof in the width direction W.

In the width direction W, each of the widthwise end portions 2a and 2b of the bonded portion 2 is located outside relative to a center of a corresponding one of the adjacent optical fibers 10A and 10B. Specifically, the widthwise end portion 2a is located outside relative to a straight line P1 connecting a center point O1 of the optical fiber 10A and the contact point Q1. Similarly, the widthwise end portion 2b is located outside relative to a straight line P2 connecting a center point O2 of the optical fiber 10B and the contact point Q2. The outside refers to outside when the straight line P3 is a center. When three or more optical fibers 10 are bonded to form the bonded portion 2, the widthwise end portion 2a and the widthwise end portion 2b are formed between each of two outermost optical fibers 10 among the three or more optical fibers 10 and the optical fiber 10 located inside relative to a corresponding one of the two outermost optical fibers 10.

In the width direction W, a distance U between the widthwise end portion 2a and the center of the optical fiber 10A (distance between a straight line P4, which passes through the widthwise end portion 2a and is parallel to the straight line P1, and the straight line P1) is preferably equal to or greater than 1/10 R (R is a radius of the optical fibers 10A and 10B), and more preferably equal to or greater than 1/5 R, from the viewpoint of making the adhesive resin less likely to break or the like. From the viewpoint of reducing deterioration of transmission loss at low temperature, the distance U is preferably equal to or less than 2/3 R, and more preferably equal to or less than 1/2 R. The distance U may be controlled by, for example, adjusting a viscosity or the amount of the adhesive resin applied. The same applies to a distance between the widthwise end portion 2b and the center of the optical fiber 10B (distance between a straight line that passes through the widthwise end portion 2b and is parallel to the straight line P2 and the straight line P2).

Tear strength in the width direction W for the bonded portion 2 is preferably 0.005 N or more and 0.200 N or less, and more preferably 0.02 N or more and 0.10 N or less. The tear strength in the present specification is measured based on a tear test (IEC 60794-1-23:2019 ribbon tear test) defined in JIS C 6838:2019.

Figure 4:
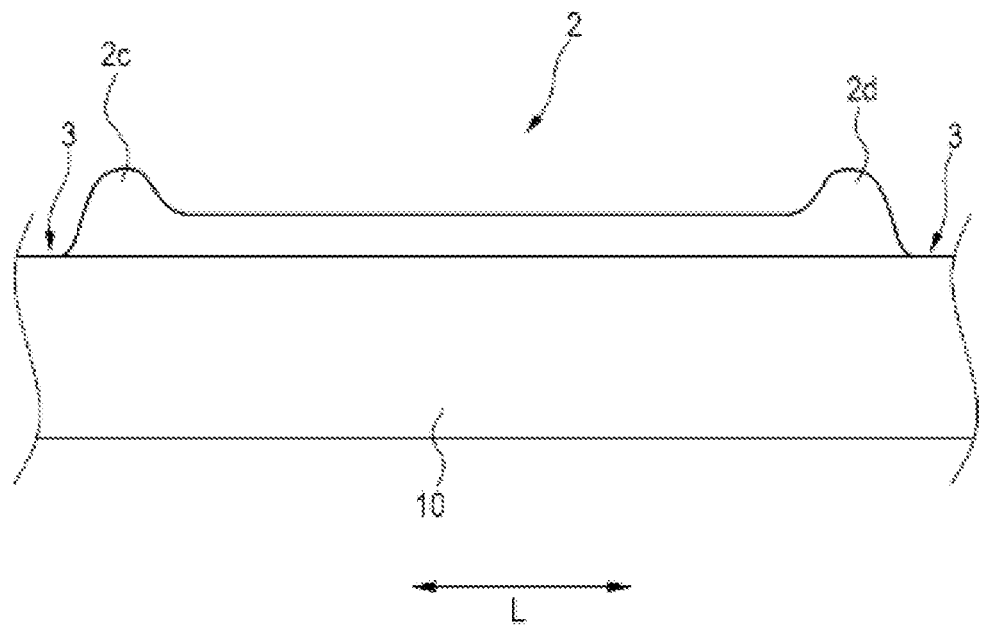
FIG. 4 is a schematic side view of the bonded portion in the optical fiber ribbon according to the embodiment.

FIG. 4 is a schematic side view of the bonded portion 2 in the optical fiber ribbon 1 according to the present embodiment. In the longitudinal direction L, at least one of longitudinal end portions 2c and 2d of the bonded portion 2 preferably has a larger protrusion height than a central portion of the bonded portion 2. As in the example of FIG. 4, both of the longitudinal end portions 2c and 2d of the bonded portion 2 in the longitudinal direction L preferably have a larger protrusion height than the central portion of the bonded portion 2 in the longitudinal direction L. The protrusions of the longitudinal end portions 2c and 2d of the bonded portion 2 may be controlled by, for example, adjusting the application amount of the adhesive resin. The protrusion height of the bonded portion 2 from the central portion is preferably 20 µm or more and 100 µm or less.

EXAMPLES

Hereinafter, the present disclosure will be described in more detail with reference to examples according to the present disclosure. The present disclosure is not limited to the following examples.

Structures and physical properties in the following production examples were measured by the following methods.
Composite Elastic Modulus A composite elastic modulus of a cured adhesive resin in a thickness direction was acquired by a test method based on ISO 14577 using a nanoindenter (Hysitron TI 950 TriboIndenter manufactured by Bruker). An indentation depth was set at 100 nm, and the measurement was performed using a Berkovich indenter.
Presence And Absence of Protrusion, Height, and Position of End Portion Presence and absence of the protrusion of the bonded portion 2 from the tangent line T in the width direction W, the maximum value H of the height of the protrusion, and positions of the widthwise end portions 2a and 2c were measured using a laser microscope. The same applies to presence and absence of the protrusions of the longitudinal end portions 2c and 2d of the bonded portion 2 in the longitudinal direction L.
Separation Resistance The optical fiber ribbon 1 was evaluated based on a twisting test defined in IEC 60794-1-2. Evaluation criteria are shown below.
  A: not separated even after 20 twists by 180°.
  B: separated after 15 twists or more and 20 twists or less by 180°.
  C: separated after 10 twists or more and 15 twists or less by 180°.
  D: separated after 5 twists or more and 10 twists or less by 180°.

E: separated after 5 twists or less by 180°.

Characteristics at Low Temperature

The optical fiber ribbon 1 was subjected to a heat cycle test in which one cycle of normal temperature (23° C.)→−40° C.→−60° C. was repeated 6 times. An attenuation amount per unit distance when light having a wavelength of 1.55 μm was incident on the optical fiber 11 provided in the optical fiber ribbon 1 was measured in environments of 23° C. and −60° C., and characteristics of the optical fiber ribbon 1 were evaluated by a difference in measured value between two temperature environments. Evaluation criteria are shown below.

A: difference in measured value was 0.05 dB/km or less
  B: difference in measured value was more than 0.05 dB/km and 0.1 dB/km or less
  C: difference in measured value was more than 0.1 dB/km and 0.3 dB/km or less
  D: difference in measured value is 0.3 dB/km or more Tear Strength Tear strength was measured based on a tear test defined in JIS C 6838 (2019). In the tear test, a sample length was set at 150 mm (set such that a bonded portion was located at a central portion), a distance between chucks was set at 70 mm, and a pulling speed was set at 200 mm/min. A peak value was used as a measured value, and measured values of 5 samples were acquired for each of the production examples, and an arithmetic average thereof was used as the tear strength.

Production Examples 1 to 42

The optical fiber ribbons 1 of Production Examples 1 to 42 were produced using 6 types of adhesive resins having different composite elastic modulus, and varied in presence and absence of a protrusion from the tangent line T and presence and absence of a protrusion of the bonded portion 2 at a longitudinal end portion. In Production Examples 1 to 42, the tear strength was about 0.03 N. The maximum value H of the height of a protrusion was about 30 μm. The distance U in the width direction W was in a range of 0 or more and ½ R or less.

The optical fiber ribbons 1 of Production Examples 1 to 42 were evaluated for separation resistance and characteristics at low temperature. Results are shown in Table 1. In Table 1, Production Examples 8, 9, 14, 15, 20, 21, 26, 27, 32, 33, 38 and 39 are examples, and the other Production Examples are comparative examples.

TABLE 1

| | Bonded Portion | | | Separation Resistance | Characteristics at Low Temperature |
|---|---|---|---|---|---|
| | Composite Elastic Modulus (GPa) | Protrusion | Protrusion at Longitudinal End Portion | | |
| Production Example 1 | 0.4 | Yes | No (Flat) | D | B |
| Production Example 2 | | | Only One End | C | B |
| Production Example 3 | | | Both Ends | C | B |
| Production Example 4 | | No | No (Flat) | D | B |
| Production Example 5 | | | Only One End | D | B |
| Production Example 6 | | | Both Ends | D | B |
| Production Example 7 | 0.5 | Yes | No (Flat) | C | B |
| Production Example 8 | | | Only One End | B | B |
| Production Example 9 | | | Both Ends | B | B |
| Production Example 10 | | No | No (Flat) | D | B |
| Production Example 11 | | | Only One End | D | B |
| Production Example 12 | | | Both Ends | C | B |
| Production Example 13 | 1.5 | Yes | No (Flat) | C | B |
| Production Example 14 | | | Only One End | B | B |
| Production Example 15 | | | Both Ends | B | B |
| Production Example 16 | | No | No (Flat) | D | B |
| Production Example 17 | | | Only One End | C | B |
| Production Example 18 | | | Both Ends | B | B |
| Production Example 19 | 3.0 | Yes | No (Flat) | B | B |
| Production Example 20 | | | Only One End | B | B |
| Production Example 21 | | | Both Ends | A | B |
| Production Example 22 | | No | No (Flat) | C | B |
| Production Example 23 | | | Only One End | C | B |
| Production Example 24 | | | Both Ends | C | B |
| Production Example 25 | 4.5 | Yes | No (Flat) | B | B |
| Production Example 26 | | | Only One End | A | B |
| Production Example 27 | | | Both Ends | A | B |
| Production Example 28 | | No | No (Flat) | B | B |
| Production Example 29 | | | Only One End | B | B |
| Production Example 30 | | | Both Ends | B | B |
| Production Example 31 | 6.0 | Yes | No (Flat) | A | B |
| Production Example 32 | | | Only One End | A | B |
| Production Example 33 | | | Both Ends | A | B |
| Production Example 34 | | No | No (Flat) | B | B |
| Production Example 35 | | | Only One End | A | B |
| Production Example 36 | | | Both Ends | A | B |
| Production Example 37 | 6.5 | Yes | No (Flat) | A | C |
| Production Example 38 | | | Only One End | A | C |
| Production Example 39 | | | Both Ends | A | D |
| Production Example 40 | | No | No (Flat) | B | B |
| Production Example 41 | | | Only One End | A | B |
| Production Example 42 | | | Both Ends | A | C |

Production Examples 43 to 52

The optical fiber ribbons 1 of Production Examples 43 to 52 were produced using 6 types of adhesive resins having different composite elastic modulus, and varied in the tear strength for the bonded portion 2. In Production Examples 43 to 52, the protrusion of the bonded portion 2 from the tangent line T was "yes", and the distance U of the bonded portion 2 in the width direction W was in the range of 0 or more and ½ R or less. The maximum value H of the height of a protrusion was about 30 μm. In addition, the longitudinal end portions 2c and 2d of the bonded portion 2 in the longitudinal direction L protruded further than the central portion of the bonded portion 2 in the longitudinal direction L. The optical fiber ribbons 1 of Production Examples 43 to 52 were evaluated for separation resistance. Results are shown in Table 2. Production Examples 43 to 52 are examples.

TABLE 2

| | Bonded Portion | | |
|---|---|---|---|
| | Composite Elastic Modulus (GPa) | Tear Strength (N) | Separation Resistance |
| Production Example 43 | 0.5 | 0.005 to 0.200 | B |
| Production Example 44 | | >0.200 | B |
| Production Example 45 | 1.5 | 0.005 to 0.200 | B |
| Production Example 46 | | >0.200 | B |
| Production Example 47 | 3.0 | 0.005 to 0.200 | B |
| Production Example 48 | | >0.200 | A |
| Production Example 49 | 4.5 | 0.005 to 0.200 | B |
| Production Example 50 | | >0.200 | A |
| Production Example 51 | 6.0 | 0.005 to 0.200 | B |
| Production Example 52 | | >0.200 | A |

Production Examples 53 to 67

The optical fiber ribbons 1 of Production Examples 53 to 67 were produced using 6 types of adhesive resins having different composite elastic modulus, and varied in the maximum value H of the height of a protrusion of the bonded portion 2. In Production Examples 53 to 67, the protrusion of the bonded portion 2 from the tangent line T was "yes", and the distance U of the bonded portion 2 in the width direction W was in the range of 0 or more and ½ R or less. The tear strength was about 0.03 N. In addition, the longitudinal end portions 2c and 2d of the bonded portion 2 in the longitudinal direction L protruded further than the central portion of the bonded portion 2 in the longitudinal direction L. The optical fiber ribbons 1 of Production Examples 53 to 67 were evaluated for separation resistance and characteristics at low temperature. Results are shown in Table 3. Production Examples 53 to 67 are examples.

TABLE 3

| | Bonded Portion | | | Characteristics at Low Temperature |
|---|---|---|---|---|
| | Composite Elastic Modulus (GPa) | Protrusion Height (μm) | Separation Resistance | |
| Production Example 53 | 0.5 | 10 | C to B | B |
| Production Example 54 | | 100 | B | B |
| Production Example 55 | | 120 | B | D |
| Production Example 56 | 1.5 | 10 | C to B | B |
| Production Example 57 | | 100 | B | B |
| Production Example 58 | | 120 | B | D |
| Production Example 59 | 3.0 | 10 | C to B | B |
| Production Example 60 | | 100 | A | B |
| Production Example 61 | | 120 | A | D |
| Production Example 62 | 4.5 | 10 | C to B | B |
| Production Example 63 | | 100 | A | B |
| Production Example 64 | | 120 | A | D |
| Production Example 65 | 6.0 | 10 | C to B | B |
| Production Example 66 | | 100 | A | B |
| Production Example 67 | | 120 | A | D |

Production Examples 68 to 87

The optical fiber ribbons 1 of Production Examples 68 to 87 were produced using 6 types of adhesive resins having different composite elastic modulus, and varied in the distance U in the width direction W. In Production Examples 68 to 87, the protrusion of the bonded portion 2 from the tangent line T was "yes". The tear strength was about 0.03 N. The maximum value H of the height of a protrusion was about 30 μm. In addition, the longitudinal end portions 2c and 2d of the bonded portion 2 in the longitudinal direction L protruded further than the central portion of the bonded portion 2 in the longitudinal direction L. The optical fiber ribbons 1 of Production Examples 68 to 87 were evaluated for separation resistance and characteristics at low temperature. Results are shown in Table 4. In Table 4, the distance U of less than 0 R means that the widthwise end portion 2a of the bonded portion 2 in the width direction W is located inside relative to the straight line P1 and the widthwise end portion 2b is located inside relative to the straight line P2. Production Examples 68 to 87 are examples.

TABLE 4

| | Bonded Portion | | | Characteristics at Low Temperature |
|---|---|---|---|---|
| | Composite Elastic Modulus (GPa) | Distance U (R) | Separation Resistance | |
| Production Example 68 | 0.5 | <0 | C | A |
| Production Example 69 | | 0 or more and less than ⅕ | B | A |
| Production Example 70 | | ⅕ or more and ½ or less | A | B |
| Production Example 71 | | >½ | A | C |
| Production Example 72 | 1.5 | <0 | C | A |
| Production Example 73 | | 0 or more and less than ⅕ | B | A |
| Production Example 74 | | ⅕ or more and ½ or less | A | B |
| Production Example 75 | | >½ | A | C |
| Production Example 76 | 3.0 | <0 | C | A |
| Production Example 77 | | 0 or more and less than ⅕ | B | A |
| Production Example 78 | | ⅕ or more and ½ or less | A | B |
| Production Example 79 | | >½ | A | C |

TABLE 4-continued

|  | Bonded Portion | | | Characteristics at Low Temperature |
|---|---|---|---|---|
|  | Composite Elastic Modulus (GPa) | Distance U (R) | Separation Resistance | |
| Production Example 80 | 4.5 | <0 | C | A |
| Production Example 81 |  | 0 or more and less than 1/3 | B | A |
| Production Example 82 |  | 1/3 or more and 1/2 or less | A | B |
| Production Example 83 |  | >1/2 | A | C |
| Production Example 84 | 6.0 | <0 | C | A |
| Production Example 85 |  | 0 or more and less than 1/3 | B | A |
| Production Example 86 |  | 1/3 or more and 1/2 or less | A | B |
| Production Example 87 |  | >1/2 | A | C |

Although the present invention is described in detail with reference to specific embodiments, it is apparent to those skilled in the art that various changes and modifications can be made without departing from the spirit and scope of the present invention. In addition, the number, positions, shapes, and the like of members described above are not limited to those in the above-described embodiments, and can be changed to the number, positions, shapes, and the like suitable for carrying out the present invention.

REFERENCE SIGNS LIST

1: optical fiber ribbon
2: bonded portion
2a, 2b: widthwise end portion
2c, 2d: longitudinal end portion
3: non-bonded portion
10, 10A, 10B: optical fiber
11: optical fiber
12: primary resin layer
13: secondary resin layer
14: colored resin layer
T: tangent line
H: maximum value of height of protrusion
L: longitudinal direction
W: width direction
U: distance
O1, O2: center point
P1, P2, P3, P4: straight line
Q1, Q2: contact point
R: radius

What is claimed is:

1. An intermittently coupled optical fiber ribbon in which a bonded portion in which adjacent optical fibers are bonded by an adhesive resin and a non-bonded portion in which the adjacent optical fibers are not bonded by the adhesive resin are intermittently provided in a longitudinal direction among a part or all of a plurality of optical fibers arranged side by side in a width direction orthogonal to the longitudinal direction, wherein
 the bonded portion is provided on one side of the optical fiber ribbon,
 a part of the bonded portion protrudes further than a tangent line passing through surfaces of the adjacent optical fibers on the one side,
 in the longitudinal direction, at least one of longitudinal end portions of the bonded portion has a larger protrusion height than a central portion of the bonded portion, and
 the adhesive resin has a composite elastic modulus of 0.5 GPa or more and 6.0 GPa or less at 23° C.

2. The optical fiber ribbon according to claim 1, wherein tear strength when tearing the bonded portion measured based on a tear test defined in JIS C 6838:2019 is 0.005 N or more and 0.200 N or less.

3. The optical fiber ribbon according to claim 1, wherein a maximum value of the protrusion height of the bonded portion from the tangent line is 10 μm or more and 100 μm or less.

4. The optical fiber ribbon according to claim 1, wherein in the width direction, each of widthwise end portions of the bonded portion is located outside relative to a center of a corresponding one of the adjacent optical fibers.

* * * * *